United States Patent
Collier et al.

(10) Patent No.: US 8,199,855 B2
(45) Date of Patent: Jun. 12, 2012

(54) ANTENNA DIVERSITY

(75) Inventors: James Digby Yarlet Collier, Suffolk (GB); Steven Mark Singer, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 816 days.

(21) Appl. No.: 12/088,077

(22) PCT Filed: Sep. 4, 2006

(86) PCT No.: PCT/GB2006/003272
§ 371 (c)(1),
(2), (4) Date: Jul. 11, 2008

(87) PCT Pub. No.: WO2007/034133
PCT Pub. Date: Mar. 29, 2007

(65) Prior Publication Data
US 2009/0010311 A1    Jan. 8, 2009

(30) Foreign Application Priority Data

Sep. 26, 2005   (GB) .................... 0519582.1

(51) Int. Cl.
*H03K 9/00* (2006.01)
*H04L 27/00* (2006.01)
(52) U.S. Cl. ..... 375/316; 375/267; 375/347; 455/277.1; 455/277.2
(58) Field of Classification Search .................. 375/267, 375/316, 347; 455/277.1, 277.2
See application file for complete search history.

(56) References Cited

U.S. PATENT DOCUMENTS

| | | | | |
|---|---|---|---|---|
| 5,561,673 A | * | 10/1996 | Takai et al. | 714/708 |
| 5,689,502 A | | 11/1997 | Scott | |
| 5,692,019 A | * | 11/1997 | Chang et al. | 375/347 |
| 5,748,669 A | | 5/1998 | Yada | |
| 6,366,764 B1 | | 4/2002 | Yang | |
| 6,449,499 B1 | | 9/2002 | Ishikura | |
| 7,933,363 B2 | | 4/2011 | Hammersley | |
| 2002/0183087 A1 | * | 12/2002 | Spencer et al. | 455/550 |
| 2005/0053039 A1 | * | 3/2005 | Dewan et al. | 370/334 |

FOREIGN PATENT DOCUMENTS

| | | |
|---|---|---|
| EP | 0454585 A1 | 10/1991 |
| EP | 1239609 A2 | 9/2002 |
| JP | 8195704 A | 7/1996 |
| JP | 2002101028 A | 4/2002 |
| WO | WO 01/41329 A1 | 6/2001 |
| WO | WO 02/098018 | 12/2002 |
| WO | WO 02/098018 A | 12/2002 |
| WO | 2007034133 | 3/2007 |

OTHER PUBLICATIONS

International Search Report corresponding to PCT/GB2006/003272, filed Sep. 4, 2006. Written Opinion of the International Searching Authority corresponding to PCT/GB2006/003272, filed Sep. 4, 2006. Examination Report dated May 3, 2010 for Application No. 06779292.9.
Machine Translation of Japanese Patent No. 8195704A.
Machine Translation of Japanese Patent Application 2002101028A.

* cited by examiner

*Primary Examiner* — Curtis Odom
(74) *Attorney, Agent, or Firm* — Greenberg Traurig, LLP

(57) ABSTRACT

A communication device for receiving a signal in the form of a series of bursts, each burst being at one of a plurality of different available transmission modes, the communication device comprising: two antennas; a receiver unit coupled to the antennas for preferentially receiving signals from a selected one of the antennas; and an antenna selection unit for selecting for each received burst with which of the antennas the receiver unit is to preferentially receive signals.

22 Claims, 5 Drawing Sheets

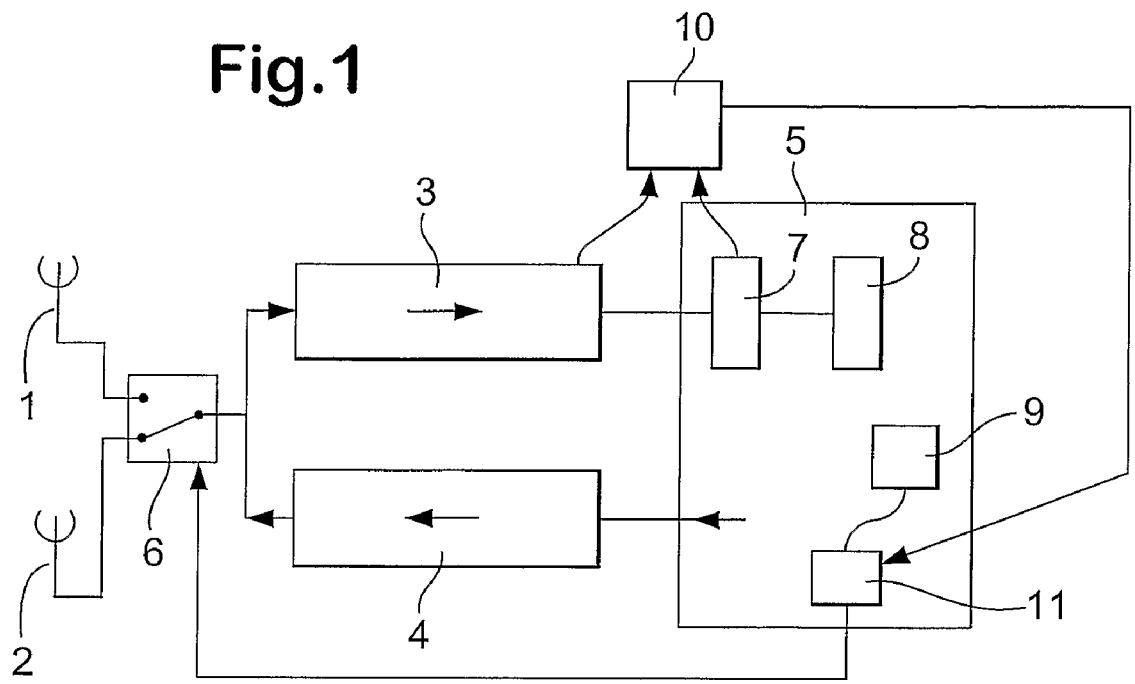

ANTENNA DIVERSITY

This application is a national stage filing under 35 U.S.C. 371 of International Application PCT/GB2006/003272, filed on 4 Sep. 2006, which claims priority to United Kingdom Application No: GB 0519582.1 filed on 26 Sep. 2005. International Application PCT/GB2006/003272 was published under PCT Article 21(2) in English.

This invention relates to diversity receivers, especially for frequency hopping applications.

In frequency hopping communication systems signals are transmitted on a series of different frequencies in successive short bursts. One example is the Bluetooth system, in which signals are transmitted by hopping between 79 channels, with a burst transmitted at each hop.

It is generally desirable to increase the range of operation of communication systems. In a radio system such as Bluetooth, it might theoretically be expected that if transmission power is increased by a factor of 100, range will be increased by a factor of 10. In practice, however, range is typically increased by only a factor of around 0.3. This is due to the fact that in realistic environments there is interference between signals that have taken different paths between the transmitter and the receiver. This interference results in localized regions of cancellation or "fades".

Digital communication systems such as Bluetooth normally incorporate error correction mechanisms that can accommodate some signal degradation. However, when there are too many errors—typically more than 2% for a voice signal carried over Bluetooth—the underlying signal will not be recoverable.

An antenna diversity transceiver has two or more antennas that are spaced apart. The transceiver can use the antennas together or can select a preferred one of the antennas for transmission or reception. This offers advantages because when one antenna is located in a fade, another antenna may still be effective. Antenna diversity has previously been implemented in devices such as DECT base stations.

There are well-known methods for selecting how to combine or choose between diversity antennas in a system that operates at a single constant frequency for transmission or reception, such as a typical TDMA (time division multiple access) system. In such systems it is relatively straightforward to identify which antenna will provide better performance at any time. The system operates for a prolonged period at a single frequency and so the performance of the antennas at that frequency can be monitored and used as the basis for selection between them.

Selecting between antennas in a frequency hopping system is more complex because the locations of fades depend on the frequency at which the system is operating. Because the system transmits only short bursts at each frequency it is not possible to make a prolonged measurement of the performance of each antenna continuously in a way that is directly indicative of its performance at a particular frequency. Unlike in a system in which transmission continues at a particular frequency for a prolonged time, the movement of the antenna into a fade cannot be tracked continuously in a frequency hopping system. For that reason, antenna diversity is not widely used in frequency hopping systems.

There is therefore a need for an improved method of antenna selection in antenna diversity transmitters and/or receivers.

According to one aspect of the present invention there is provided a communication device for receiving a signal in the form of a series of bursts, each burst being at one of a plurality of different available transmission modes, the communication device comprising: two antennas; a receiver unit coupled to the antennas for preferentially receiving signals from a selected one of the antennas; and an antenna selection unit for selecting for each received burst with which of the antennas the receiver unit is to preferentially receive signals.

According to a second aspect of the present invention there is provided a method for receiving a signal in the form of a series of bursts, each burst being at one of a plurality of different available transmission modes, by means of a communication device comprising two antennas, the method comprising: selecting for each received burst with which of the antennas the receiver unit is to preferentially receive signals; and preferentially receiving each burst from the selected one of the antennas.

Preferably the receiver unit is arranged to preferentially receive each burst from a given antenna by receiving it with only that antenna. In that embodiment signals received by the other antenna are ignored by the receiver for that burst. Alternatively, a weighting system may be employed. In that embodiment, instead of the signals from a single antenna being used exclusively, signals are received with a higher weighting from the selected antenna than from the or each other antenna. To achieve this, variable strength filters may be employed between the antennas and the receiver, their filter coefficients being dependent on which antenna is selected as being preferred for each burst. Equivalent considerations can be employed when data is to be transmitted, as will be discussed further below. Signals can be preferentially transmitted from a selected antenna by either being transmitted exclusively from that antenna or by being transmitted from that antenna with a greater weight than from the or each other antenna.

Preferably the receiver is arranged to demodulate and/or decode the signals received from the selected one of the antennas. For this purpose it may comprise demodulation and/or decoding circuitry.

Preferably the communication device comprises a signal analysis unit for analyzing each received burst to determine whether it meets a predetermined reception quality criterion. The antenna selection unit may then be responsive to the signal analysis unit for selecting from which of the antennas the receiver is to receive signals. The reception unit can be arranged to control the reception unit to: if a burst is to be received with a certain transmission mode and the last burst received with that transmission mode was received above the reception quality criterion, receive the burst with the same antenna as was used to receive that last burst; and if a burst is to be received with a certain transmission mode and the last burst received with that transmission mode was received below the reception quality criterion, receive the burst with a different antenna from that which as was used to receive that last burst.

The reception quality criterion may be a criterion of received signal strength, alone or with other parameters taken into account too. The reception quality criterion may be a criterion of error rate, alone or with other parameters taken into account too.

The antenna selection unit may have access to a data structure identifying for each of the available transmission modes with which of the antennas the receiver is to receive signals the next time a burst is received having that transmission mode, and the antenna selection unit is arranged to perform the said selecting from which of the antennas the receiver is to receive signals by: if a burst is to be received with a certain transmission mode, accessing the data structure to determine which antenna is identified in the data structure for that transmission mode and controlling the reception unit to receive the burst with that antenna. That data structure could be a look-up table stored locally in memory of the device or elsewhere (accessible, for instance over a communication link) or it could be an algorithm.

The antenna selection unit is preferably responsive to the signal analysis unit to: if a burst is received with a certain transmission mode and does not meet the reception quality criterion, change which antenna is identified in the data structure for the transmission mode of that burst.

The antenna selection unit is preferably responsive to the signal analysis unit to: if a burst is received with a certain transmission mode and does meet the reception quality criterion, leave unchanged which antenna is identified in the data structure for the transmission mode of that burst.

The communication device may comprise a transmitter unit for forming a signal for transmission from a selected one of the antennas with a selected one of the transmission modes, wherein the antenna selection unit is arranged to select for each transmitted burst with which of the antennas the transmitter unit is to transmit signals.

The antenna selection unit is preferably arranged to control the reception unit to: if a burst is to be transmitted with a certain transmission mode and the last burst received with that transmission mode was received above the reception quality criterion, transmit the burst with the same antenna as was used to receive that last burst; and if a burst is to be transmitted with a certain transmission mode and the last burst received with that transmission mode was received below the reception quality criterion, transmit the burst with a different antenna from that which as was used to receive that last burst.

The transmission modes may differ in that each transmission mode has a different carrier frequency.

The device may be a frequency hopping receiver. The receiver unit of the device may be adapted for receiving frequency hopping signals. The device may be a radio receiver. The antennas may be adapted for receiving radio signals. The device may be a Bluetooth receiver.

The present invention will now be described by way of example with reference to the accompanying drawings.

In the drawings:

FIG. 1 is a schematic diagram of a frequency hopping system;

FIG. 2 shows part of an antenna selection table;

Figure 4:
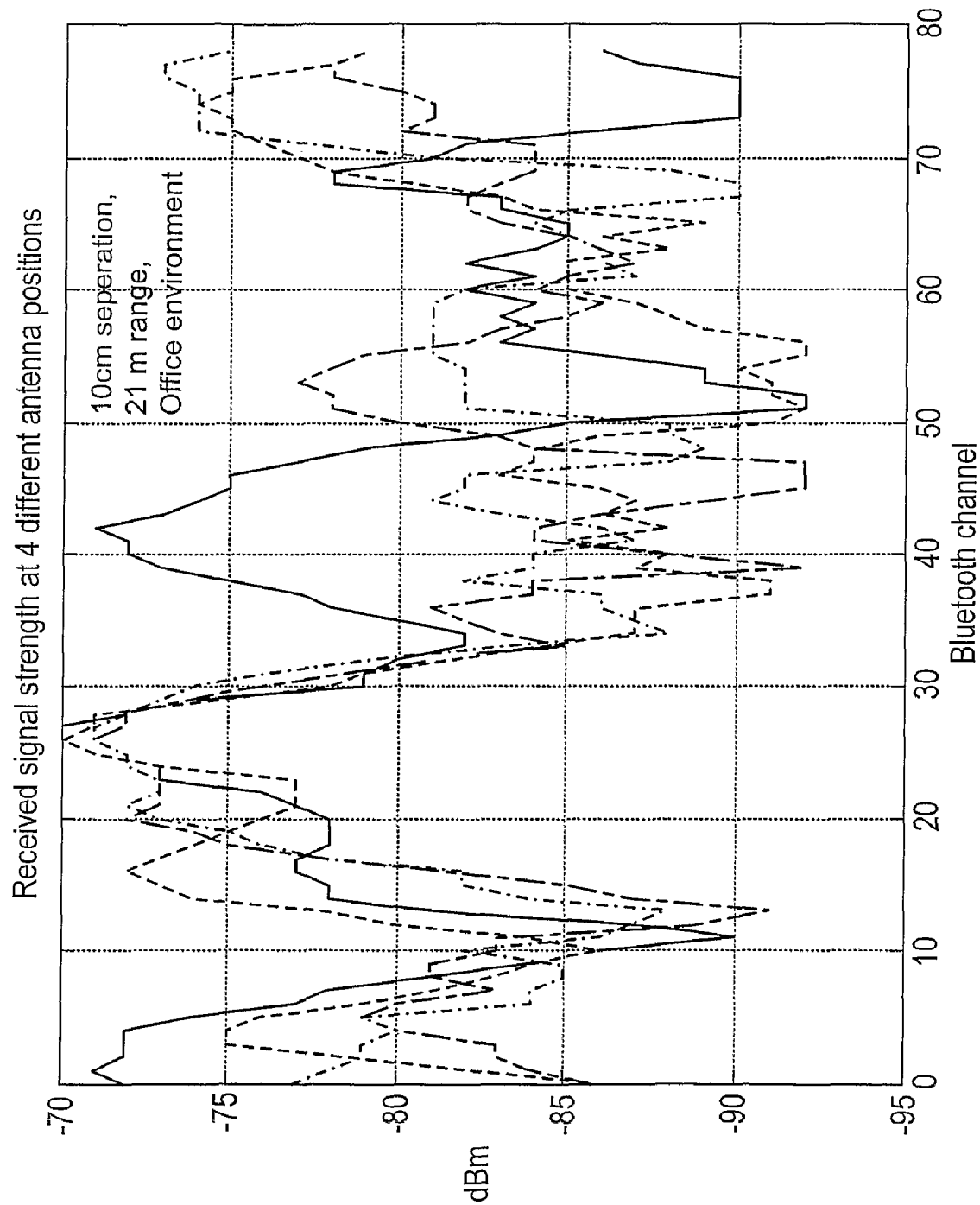
Figure 5:
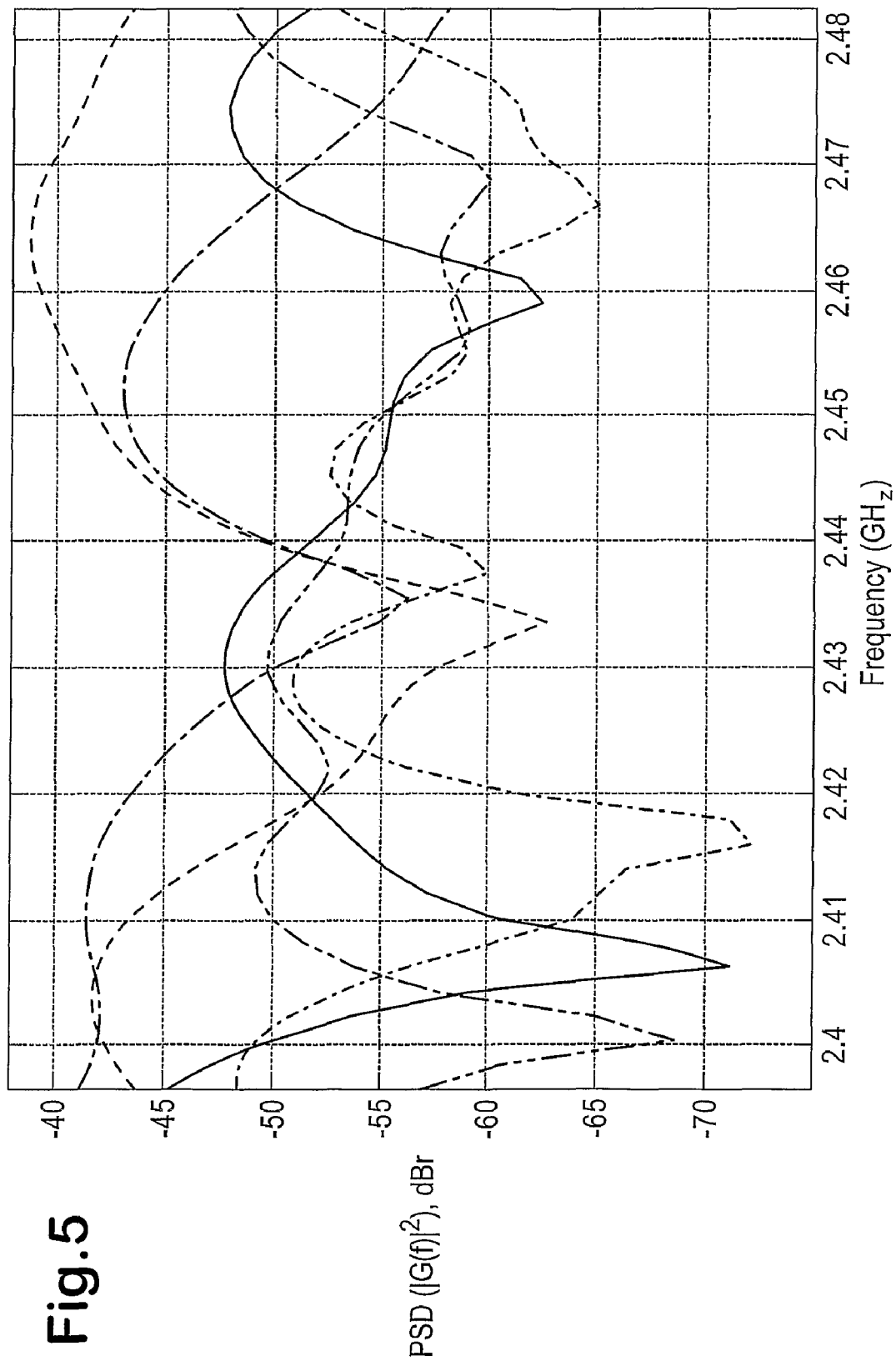
Figure 6:
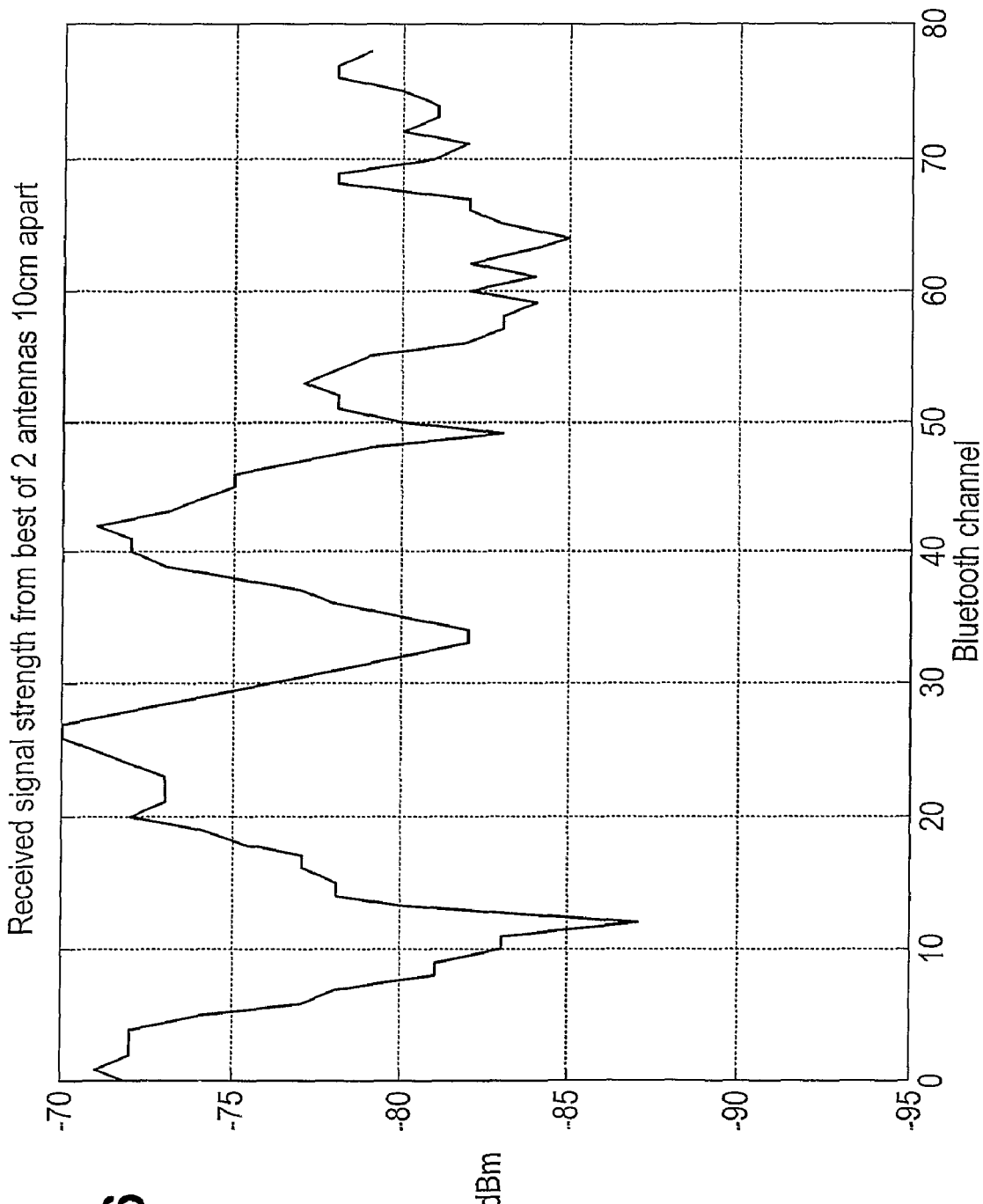

FIG. 4 shows curves plotting received signal strength in dB for the 79 Bluetooth channels for 4 different antennas 10 cm apart;

FIG. 5 shows data for a similar situation to that of FIG. 4, but derived by simulation using UWB channel response characteristics; and FIG. 6 shows received signal strength obtained from a selected pair of the antennas of FIG. 4.

In the present system a receiver having multiple antennas and receiving frequency hopping signals makes a selection per-hop of which of the antennas is to be used for reception. The same antenna as would be used for reception at a given frequency can also be used for transmission.

In the present embodiment a relatively simple algorithm is used to select between antennas in a frequency hopping system. One antenna is used for reception at each hopping frequency. If reception at that frequency is successful then the same antenna is used the next time reception on that frequency is needed. If it is unsuccessful then a different antenna is used next time. This algorithm has been found to be highly successful.

In more detail, FIG. 1 shows a radio transceiver. The transceiver comprises spaced apart first and second antennas 1, 2, a receive chain 3, a transmit chain 4 and a baseband processing unit 5. A switch 6 is located between the antennas and the transmit and receive chains. The switch is controlled by the baseband processing unit 5 and allows a selected one of the antennas to be connected to the transmit and receive chains.

The receive chain 3 amplifies and demodulates signals received by a selected one of the antennas to allow them to be decoded by the baseband processing unit 5. The transmit chain 4 modulates and amplifies signals generated by the baseband processing unit in order that they can be transmitted by a selected one of the antennas. As is normal in frequency hopping systems, the receive and transmit chains get input from the baseband processing unit indicating on which of the available frequencies they are to receive or transmit.

The receiver includes a signal quality measurement unit 10, which measures the quality with which each burst is received and compares it to a pre-set threshold. The signal quality measurement unit could be implemented in the receive chain (e.g. if it is to assess a threshold of received signal strength) or in the baseband processing unit (e.g. if it is to assess a threshold of bit error rate). The threshold is a threshold of acceptable reception of signals during a burst. That threshold could, for example, be a threshold level of amplitude, of signal-to-interference ratio, or of error in the decoded signal (for instance a threshold bit error or frame error rate). A combination of the above could be used. A preferred threshold is whether the signals of the burst have been decoded with sufficient confidence that the burst will be passed by a decoding and error correction section 7 of the baseband processing unit for further processing by an upper-level processing section 8, or will the decoding and error correction section indicate to the upper-level processing section that the burst has been lost. One example of a threshold suitable for use in a Bluetooth system is that the received signal strength (RSSI) exceeds −85 dB.

An antenna selection table, an example of which is illustrated in FIG. 2, is stored in a memory 9 of the baseband processing unit. The table indicates which of the antennas 1, 2 is to be used for the next reception at each available hopping frequency. In FIG. 2 the table is shown as having two columns: one indicating the channel number and one indicating the antenna number. In practice, the channel number could be omitted and the antenna number inferred from the bit position of the antenna number data. In the case of a two antenna system the antenna number data could be stored as a single bit. This allows the table to be especially compact. The bit is swapped if reception of a burst on a channel is unsuccessful, or falls below a predetermined threshold, and is otherwise not changed. In the case of more than two antennas the antenna to be used for subsequent reception can be selected in turn, or at random from the antennas not used last time. The initial selection of antenna when the system is initialized is arbitrary.

Alternatively, the table could list in one column which antenna was last used to receive on each channel and in another column whether that reception was successful, or met the predetermined threshold. From this data the antenna to be used for reception on the next occasion could be determined. However, this would require an extra column in the table.

In operation, the baseband processing unit has knowledge of the frequency hopping scheme in use, and its antenna selection unit 11 can determine which frequency is to be used for the next burst to be received. Immediately before that burst it provides input to the receive chain to configure the receive chain for reception at that frequency. It also checks the antenna selection table to identify which of the antennas is to be used for the next reception at that frequency. It then provides input to the switch 6 to configure it to connect that antenna to the receive chain and disconnect the other antenna from the receive chain. As a result, when the burst is received it is received at the desired frequency and through the antenna indicated by the antenna selection table.

The burst passes to the decoding and error correction section 7, which attempts to decode the burst and apply any appropriate error correction techniques to the decoded data. If the burst has been received with sufficient confidence it passes it to the upper-level processing section 8. The upper-level processing section could, for example, be an audio processing unit that recovers audio data represented by the received signal and replays it to a user. If the burst has not been received with sufficient confidence then the decoding and error correction informs the upper-level processing section that the burst has been lost. In the case of non-real-time data, the transceiver could ask the transmitter to retransmit that burst.

If the burst has been received with quality above the pre-determined threshold (in this example, with a quality that justifies it being passed to the upper-level processing section 8) then the antenna selection unit 11 of the baseband processing section leaves the data in the antenna selection table unchanged. On the other hand, if the burst has been received with quality below the predetermined threshold then the data in the antenna selection table for the frequency of that burst is changed to indicate another antenna than that which was used for reception of that burst. In the case of a system with two antennas it is swapped to indicate an antenna other than that which was used for reception of that burst. In the case of a system with more than two antennas it is changed according to a predetermined scheme: for example by indexing to the next antenna in turn or by changing to another of the antennas at random. The next burst to be received at the frequency of that burst will be received using the antenna as now indicated by the antenna selection table.

As a result, if a burst at a certain frequency is received with a quality above the pre-set threshold then the next burst at that frequency will be received using the same antenna. Otherwise, it is received with another antenna.

FIGS. 3 to 6 illustrate simulation and experimental results demonstrating the method discussed above in a Bluetooth system.

In the HV3 Bluetooth system the voice link duty cycle is 1:6 at a 1600 Hz cycle rate, so with approximately 80 channels each channel is repeated on average at 3 Hz for a given channel.

Figure 3:
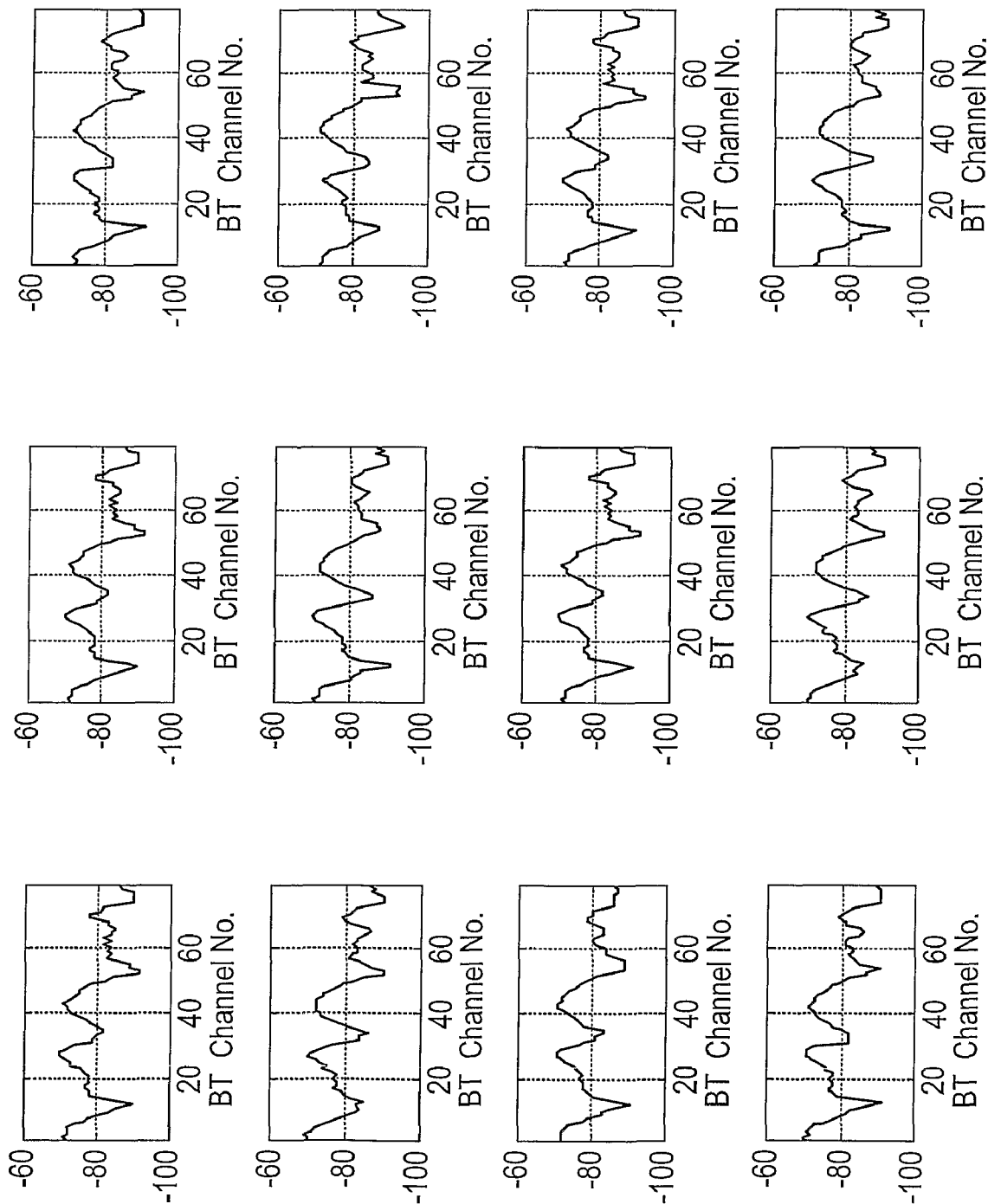
FIG. 3 illustrates received signal strength in dB for the 79 Bluetooth channels at a range of antenna positions, the positions being taken at 100 ms intervals for a receiver moving at walking speed through an office environment.

FIG. 3 illustrates received signal strength in dB for the 79 Bluetooth channels at a range of antenna positions, the positions being taken at 100 ms intervals for a receiver moving at walking speed through an office environment. It can be seem that there is little correlation between the curves over 5 cm and almost complete decorrelation over 10 cm.

FIG. 4 shows curves plotting received signal strength in dB for the 79 Bluetooth channels for 4 different antennas 10 cm apart. It can be seen that there is little correlation between the curves. FIG. 5 shows data for a similar situation, but derived by simulation using UWB channel response characteristics.

FIG. 6 shows received signal strength obtained from a selected pair of the antennas of FIG. 4, taking the better of those two antennas at each frequency. This offers a significant improvement over any individual one of the antennas. Whilst this improvement on the data of FIG. 4 would only be expected to be achieved from the present algorithm when the receiver was substantially stationary, so that the antennas' performance did not vary over time, the present algorithm would not be expected to provide a worse performance than using a single antenna since the performance of the antennas is not correlated.

It will be seen that in FIG. 6 the received signal strength exceeds −85 dB, which is the approximate threshold for acceptable voice data reception over Bluetooth, for almost all the channels.

The present algorithm could be applied to a device that is solely a receiver. Alternatively it could be applied to a device that is a transceiver, and can also transmit signals. The antenna(s) used to transmit signals could be held constant, or could be varied by means of some other algorithm. However, in a preferred arrangement the same antenna is used for transmission on a given channel as would be used according to the algorithm described above for reception on that channel. In the embodiment of FIGS. 1 and 2 that would be the antenna indicated for that channel by the table of FIG. 2. In contrast, the normal approach in multi-antenna systems is to use the same antenna(s) for all transmissions and to rely on the receiver to perform diversity reception if required. However, by using the approach described above diversity need be implemented at only one end of the link whilst communication in both directions can be enhanced, and without any signaling overhead over the communication link.

The spacing of the antennas may be limited by the measurements of the device in which they are to be installed. However, the antennas should preferably be located less than one wavelength apart for the system in question: around 12 cm for a Bluetooth system. The antennas should preferably be located more than around half a wavelength apart for the system in question. For example, in the case of a Bluetooth system the antennas are preferably located between around 10 cm and around 5 cm apart. At a wavelength spacing and below at half a wavelength spacing the advantages of having two antennas would be expected to diminish since the antennas will provide more similar performance.

The present invention may be applied to other forms of diversity: for example it could be applied to a receiver having multiple antennas located at essentially the same location but having different polarization, or having different configurations. The present invention could be applied to systems other than frequency hopping systems: i.e. those that transmit signals in bursts that differ from each other in transmission mode by some other feature than carrier frequency. For example, it could be applied to CDMA systems in which each burst is transmitted with a spreading code selected from a predetermined set. An antenna could then be selected in the manner described above for use with each spreading code. It could also be used in multi-band systems, for selecting which band to use.

Another approach to deciding which antenna to use for a particular burst is to measure performance of the antennas at the start of each burst. This could, for example, be done using a preamble of the burst. That measurement could then be used as the basis for selection of antennas for the remainder of the burst. The antenna that best received the preamble is used to receive the remainder of the burst. The determination of which antenna received the preamble the best could be made based on a suitable quality criterion, such as received signal strength.

The approaches described above are especially applicable in radio communication systems, most particularly short-range radio communication systems such as Bluetooth. It could be implemented in other systems, especially but not exclusively frequency hopping systems.

There could be two or more antennas. The algorithm is at its most simple when only two antennas are used.

Instead of the selected antenna being used exclusively for reception or transmission it could be used together with one or more other antennas of the device but with the selected antenna being used with a greater weighting than the others. This may be achieved by the use of filters between the antennas and the receiver, rather than a simple switch.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A communication device for receiving and transmitting signals in the form of a series of bursts, each burst being at one of a plurality of different available transmission modes, the communication device comprising:
    two antennas;
    a receiver unit coupled to the antennas for preferentially receiving signals from a selected one of the antennas;
    a transmitter unit for forming a signal for transmission from a selected one of the antennas with a selected one of the transmission modes;
    an antenna selection unit for:
        selecting for each received burst with which of the antennas the receiver unit is to preferentially receive signals, and
        selecting for each transmitted burst with which of the antennas the transmitter unit is to transmit signals;
    a signal analysis unit configured to analyze each received burst in order to make a determination of whether that received burst meets a predetermined reception quality criterion;
    wherein the signal analysis unit is arranged to control the antenna selection unit in dependence on said determinations to:
    if a burst is to be received with a certain transmission mode and the last burst received with that transmission mode is determined to have been received above the reception quality criterion, preferentially receive the burst with the same antenna as was used to receive that last burst;
    if a burst is to be received with a certain transmission mode and the last burst received with that transmission mode is determined to have been received below the reception quality criterion, preferentially receive the burst with a different antenna from that which was used to receive that last burst;
    if a burst is to be transmitted with a certain transmission mode and the last burst received with that transmission mode is determined to have been received above the reception quality criterion, transmit the burst preferentially with the same antenna as was used to receive that last burst; and
    if a burst is to be transmitted with a certain transmission mode and the last burst received with that transmission mode is determined to have been received below the reception quality criterion, transmit the burst preferentially with a different antenna from that which was used to receive that last burst.

2. A communication device as claimed in claim 1, wherein the receiver unit is arranged to receive each burst with only the antenna selected for that burst by the antenna selection unit.

3. A communication device as claimed in claim 1, wherein the receiver unit is arranged to demodulate the signals received from the selected one of the antennas.

4. A communication device as claimed in claim 1, wherein the receiver unit is arranged to decode the signals received from the selected one of the antennas.

5. A communication device as claimed in claim 1, wherein the reception quality criterion is a criterion of received signal strength.

6. A communication device as claimed in claim 1, wherein the reception quality criterion is a criterion of error rate.

7. A communication device as claimed in claim 1, wherein the antenna selection unit has access to a data structure identifying for each of the available transmission modes with which of the antennas the receiver is to preferentially receive signals the next time a burst is received having that transmission mode, and the antenna selection unit is arranged to perform the said selecting from which of the antennas the receiver is to preferentially receive signals by: if a burst is to be received with a certain transmission mode, accessing the data structure to determine which antenna is identified in the data structure for that transmission mode and controlling the receiver unit to preferentially receive the burst with that antenna.

8. A communication device as claimed in claim 7, wherein the antenna selection unit is responsive to the signal analysis unit to:
    if a burst is received with a certain transmission mode and does not meet the reception quality criterion, change which antenna is identified in the data structure for the transmission mode of that burst.

9. A communication device as claimed in claim 8, wherein the antenna selection unit is responsive to the signal analysis unit to:
    if a burst is received with a certain transmission mode and does meet the reception quality criterion, leave unchanged which antenna is identified in the data structure for the transmission mode of that burst.

10. A communication device as claimed in claim 1, wherein the transmission modes differ in that each transmission mode has a different carrier frequency.

11. A communication device as claimed in claim 1, wherein the device is a frequency hopping receiver.

12. A communication device as claimed in claim 1, wherein the device is a radio receiver.

13. A communication device as claimed in claim 1, wherein the device is a Bluetooth receiver.

14. A communication device as claimed in claim 1, wherein the two antennas are located at essentially the same location and each antenna preferentially receives a different signal polarization.

15. A communication device as claimed in claim 1 wherein the performance of the antenna receiving the burst is measured at the start of that burst.

16. A communication device as claimed in claim 15 wherein the performance measurement is done using a preamble of the burst.

17. A communication device as claimed in claim 15 wherein the antenna selection is made such that:
    if the start of the burst was received above the reception quality criterion, the remainder of the burst is preferentially received with the same antenna as was used to receive the start of the burst; and if the start of the burst was received below the reception quality criterion, the remainder of the burst is preferentially received with a different antenna from that which was used to receive the start of the burst.

18. A communication device as claimed in claim 15, wherein the receiver unit is arranged to receive each burst with only the antenna selected for that burst by the antenna selection unit.

19. A method for receiving and transmitting signals in the form of a series of bursts, each burst being at one of a plurality of different available transmission modes, by means of a communication device comprising two antennas, the method comprising:

making a determination of whether each received burst meets a predetermined reception quality criterion;

selecting, in dependence on said determinations, for each received burst with which of the antennas the receiver unit is to preferentially receive signals, and for each transmitted burst with which of the antennas the transmitter unit is to transmit signals, the selection being responsive to the determination such that:

if a burst is to be received with a certain transmission mode and the last burst received with that transmission mode is determined to have been received above the reception quality criterion, the burst will be preferentially received with the same antenna as was used to receive that last burst;

if a burst is to be received with a certain transmission mode and the last burst received with that transmission mode is determined to have been received below the reception quality criterion, the burst will be preferentially received with a different antenna from that which was used to receive that last burst;

if a burst is to be transmitted with a certain transmission mode and the last burst received with that transmission mode is determined to have been received above the reception quality criterion, the burst will be transmitted preferentially with the same antenna as was used to receive that last burst; and if a burst is to be transmitted with a certain transmission mode and the last burst received with that transmission mode is determined to have been received below the reception quality criterion, the burst will be transmitted preferentially with a different antenna from that which was used to receive that last burst.

20. A communication device for receiving a signal in the form of a series of bursts, each burst being in one of a plurality of different available transmission modes, the communication device comprising:

a receiver unit coupled to two or more antennas together operable to receive bursts in first and second polarizations, the receiver unit preferentially receiving signals in a selected polarization;

a selection unit for selecting for each received burst in which polarization the receiver unit is to preferentially receive signals; and a signal analysis unit configured to analyze each received burst in order to make a determination of whether that received burst meets a predetermined reception quality criterion;

wherein the signal analysis unit is arranged to control the selection unit in dependence on said determinations to:

if a burst is to be received with a certain transmission mode and the last burst received with that transmission mode is determined to have been received above the reception quality criterion, preferentially receive the burst in the same polarization in which that last burst was received; and if a burst is to be received with a certain transmission mode and the last burst received with that transmission mode is determined to have been received below the reception quality criterion, preferentially receive the burst in a different polarization from that in which that last burst was received.

21. A communication device as claimed in claim 20, wherein the antennas are located at essentially the same location.

22. A method for receiving a signal in the form of a series of bursts, each burst being in one of a plurality of different available transmission modes, by means of a communication device comprising two or more antennas together operable to receive bursts in first and second polarizations, the method comprising:

making a determination of whether each received burst meets a predetermined reception quality criterion; and selecting, in dependence on said determinations, for each burst in which of the polarizations the receiver unit is to preferentially receive signals, the selection being responsive to the determination such that:

if a burst is to be received in a certain transmission mode and the last burst received having that transmission mode is determined to have been received above the reception quality criterion, preferentially receiving the burst in the same polarization in which that last burst was received; and if a burst is to be received in a certain transmission mode and the last burst received having that transmission mode is determined to have been received below the reception quality criterion, preferentially receiving the burst in a different polarization from that in which that last burst was received.

* * * * *